US012108241B1

(12) United States Patent
Lovitt

(10) Patent No.: US 12,108,241 B1
(45) Date of Patent: Oct. 1, 2024

(54) ADJUSTING GENERATION OF SPATIAL AUDIO FOR A RECEIVING DEVICE TO COMPENSATE FOR LATENCY IN A COMMUNICATION CHANNEL BETWEEN THE RECEIVING DEVICE AND A SENDING DEVICE

(71) Applicant: META PLATFORMS TECHNOLOGIES, LLC, Menlo Park, CA (US)

(72) Inventor: Andrew Lovitt, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 215 days.

(21) Appl. No.: 17/672,922

(22) Filed: Feb. 16, 2022

(51) Int. Cl.
*H04S 7/00* (2006.01)
*H04R 5/033* (2006.01)
*H04R 5/04* (2006.01)

(52) U.S. Cl.
CPC ............ *H04S 7/304* (2013.01); *H04R 5/033* (2013.01); *H04R 5/04* (2013.01); *H04R 2499/15* (2013.01); *H04S 2420/01* (2013.01)

(58) Field of Classification Search
CPC ..... H04S 7/304; H04S 2420/01; H04R 5/033; H04R 5/04; H04R 2499/15; H04R 2420/07
See application file for complete search history.

(56) References Cited

U.S. PATENT DOCUMENTS

| | | | | |
|---|---|---|---|---|
| 10,412,529 | B1 * | 9/2019 | Dantrey | H04S 7/303 |
| 10,484,811 | B1 | 11/2019 | Mindlin et al. | |
| 10,491,711 | B2 | 11/2019 | Hancock et al. | |
| 10,705,793 | B1 * | 7/2020 | Young | G10L 15/22 |
| 10,871,939 | B2 | 12/2020 | Dantrey et al. | |
| 11,082,661 | B1 | 8/2021 | Pollefeys | |
| 2015/0254340 | A1 | 9/2015 | Walker et al. | |
| 2019/0342659 | A1 * | 11/2019 | Lau | H04S 7/301 |
| 2019/0349662 | A1 * | 11/2019 | Lindahl | H04R 3/12 |

* cited by examiner

*Primary Examiner* — Jason R Kurr
(74) *Attorney, Agent, or Firm* — Weaver Austin Villeneuve & Sampson LLP

(57) ABSTRACT

An audio system determines latency for each client device of users participating in an artificial reality or augmented reality environment. The latency determined for a client device accounts for latency of a communication channel used by the client device to exchange data, as well as time for the client device to perform computational tasks. The audio system determines a distance in the artificial reality environment between a user's avatar and an audio source for audio data and adjusts one or more transfer functions for generating audio content for the user to account for effects of the latency determined for the user's client device on the audio content. In some embodiments, the audio system modifies a distance in the artificial reality environment between the user's avatar and the audio source to compensate for latency of the user's client device.

25 Claims, 6 Drawing Sheets

ADJUSTING GENERATION OF SPATIAL AUDIO FOR A RECEIVING DEVICE TO COMPENSATE FOR LATENCY IN A COMMUNICATION CHANNEL BETWEEN THE RECEIVING DEVICE AND A SENDING DEVICE

FIELD OF THE INVENTION

This disclosure relates generally to artificial reality systems, and more specifically to compensating for latency in communicating data to a client device when presenting audio data via the client device.

BACKGROUND

Users of various online systems, such as artificial reality systems exchange content with other users. For example, a sending client device transmits audio content to a receiving client device, which plays the audio content for a receiving user. In the preceding example, the sending client device and the receiving client device may be headsets displaying virtual reality or augmented reality content to users.

When playing audio content for a user, the audio content may be spatialized, so the audio content is played to account for the environment of the user for whom the audio content is played. The audio content may be modified to account for characteristics of the user for whom the audio data is played, such as sensitivities of the user to certain audio frequencies. When spatializing audio content played for a user, a delay is introduced to the audio content to incorporate a delay for the audio content to travel a distance between a location relative to the user of a source of the audio content, allowing the audio content to appear to originate from the location of the source. However, communication of the audio content to the user's client device introduces additional latency, such as from a communication channel for transmitting the audio content or hardware components of the client device generating the spatialized audio. This additional latency causes the audio data to become asynchronous with other content, such as video data, displayed along with the audio data.

SUMMARY

A client device receives audio content from a source and determines a latency delay from one or more latencies introduced from receiving the audio content. The source may be another client device or may be a server, such as a communication system, in various embodiments. Based on the latency delay, the client device modifies one or more parameters for presenting the audio content to a user. For example, the client device decreases a delay interval introduced by a transfer function applied to the audio content to spatialize the audio content by the latency delay. As another example, the client device increases a distance in an artificial reality environment between an avatar of the user and a source of the audio content by an amount determined from the latency delay. Using the modified one or more parameters, the client device presents the audio content to the user via one or more speakers.

Figure 1A:
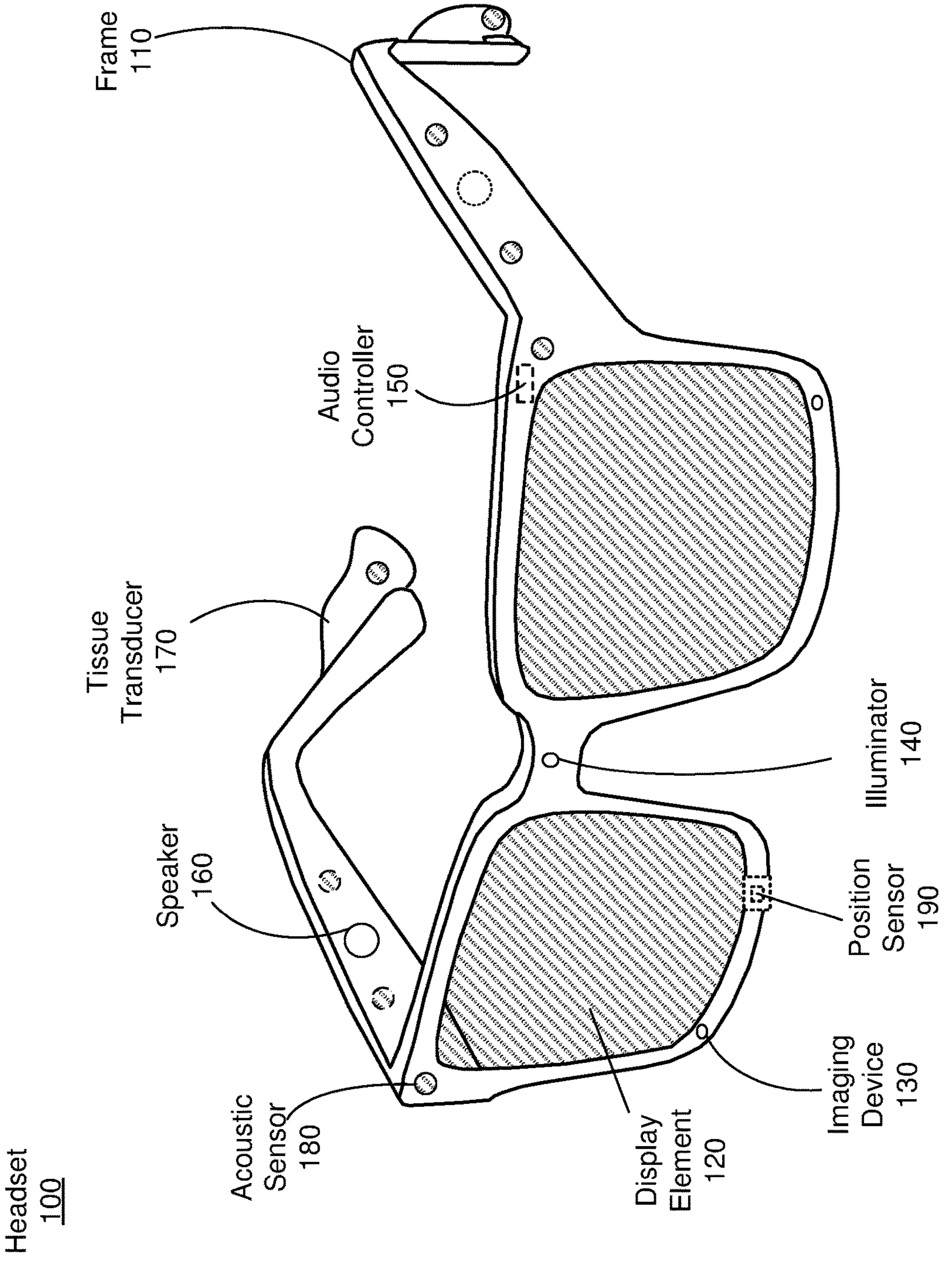
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Client devices may exchange audio content with each other through one or more communication channels. Additionally or alternatively, a client device may communicate with a communication system or other server to transmit audio data to other client devices and to receive audio content from other client devices. A client device includes an audio system that spatializes the audio content when it is played for a user, so the audio content appears to originate in a location relative to the user of the client device. For example, the client device presents an artificial reality (or an augmented reality) environment to a user of the client device, with an avatar of the user having a location in the artificial reality environment. The audio system of the client device applies one or more transfer functions to audio data so, when played to the user, the audio content appears to originate in a particular location of the audio content in the artificial reality environment relative to the avatar of the user.

When applying one or more transfer functions to the audio content, the audio system introduces a delay to the audio content based on a distance in the artificial reality environment between the avatar of the user and the location of the audio content in the artificial reality environment. For example, a delay to the audio content introduced by a transfer function delays the audio content by an amount of time for the audio content to travel the distance between the avatar of the user and the location of the audio content in the artificial reality environment and a speed of sound through air based on a temperature and a pressure of the air. In an example, a distance of 20 feet between the avatar of the user and the location of the audio content in the artificial reality environment causes a transfer function to introduce a 17.8 millisecond delay in the audio content when the artificial reality environment has conditions corresponding to a speed of sound of 343 meters per second.

However, receipt of the audio content and processing of the audio content by a user's client device introduce additional delays to the audio content. For example, a communication channel between the user's client device and another client device or a server introduces an additional time delay for the audio data, as does encoding or decoding the audio content by the client device. These additional delays combine with the delay from application of the audio content to increase an overall delay for presenting the audio content to the user of the client device. This increased overall delay can cause the audio content to lose synchronization with other content, such as video content, displayed in conjunction with the audio content.

To compensate for additional delays from transmission and processing of the audio content, an audio system of a user's client device measures one or more latencies from transmitting the audio content or processing the audio content. In various embodiments, the audio system modifies a transfer function applied to the audio content to reduce the delay applied to the audio content by the transfer function based on the measured one or more latencies. For example, the audio system decreases the delay applied by the transfer function by an amount that is directly related to the measured one or more latencies. Alternatively, the audio system increases a distance in the artificial reality environment between the avatar of the user and the source of the audio content in the artificial reality environment by a distance based on the measured one or more latencies to compensate for the one or more latencies. The modification of the transfer function or the distance in the artificial reality environment between the avatar of the user and the source of the audio content allows the audio system to compensate for the measured one or more latencies for the audio content to better synchronize with other content, such as video content.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

Figure 1B:
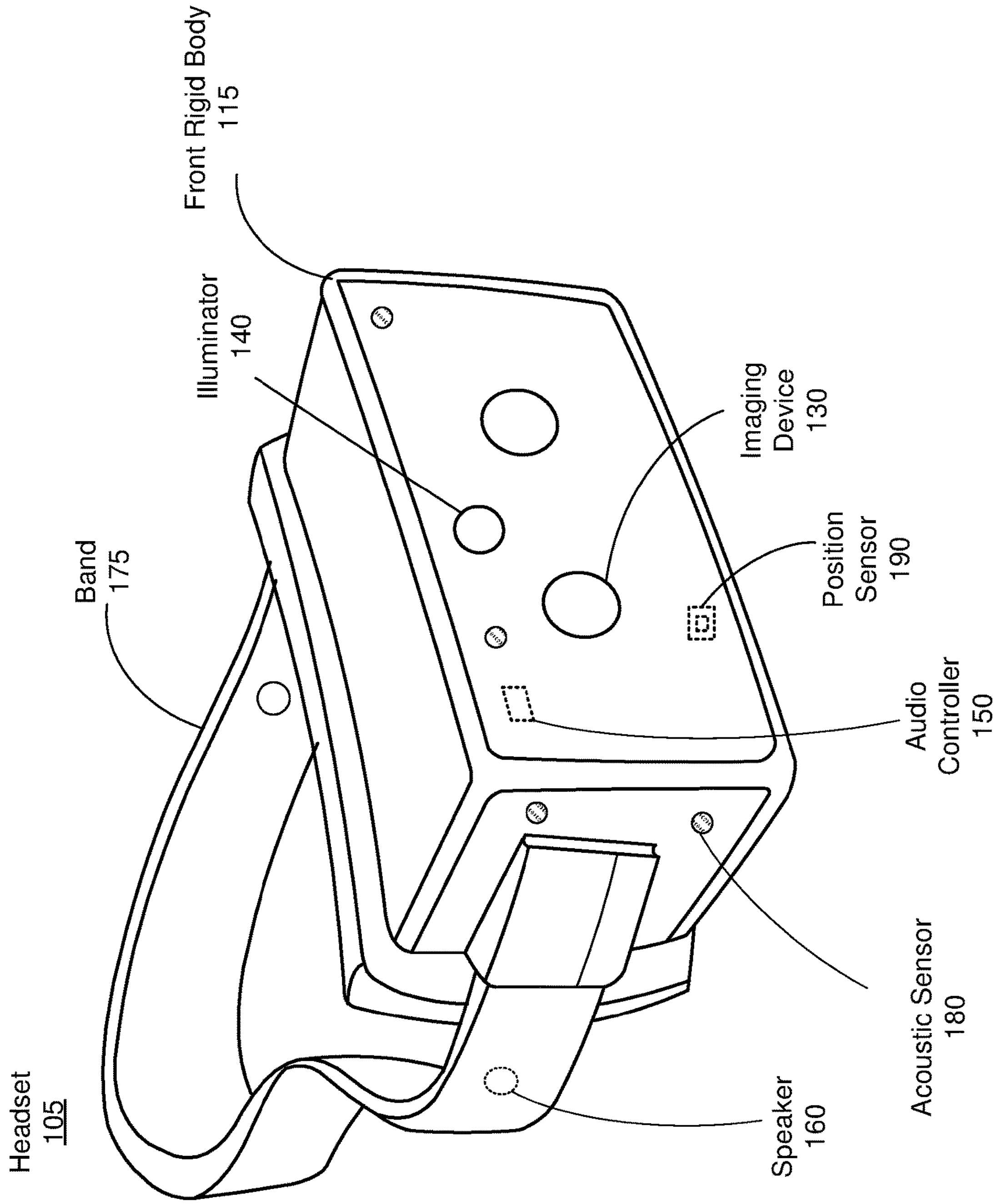
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Using headset 100 or headset 105, users may exchange content with each other. For example, one or more acoustic sensors 180 capture audio content for communication to other users. The headset 100, 105 transmits the audio content to another headset 100, 105 that plays the audio content through one or more speakers 160. In various embodiments, one or more headsets 100, 105 are communicatively coupled to a communication system, as further described below in conjunction with FIG. 3. The communication system receives audio content from a headset 100, 105 and receives a payload form a receiving headset 100, 105. The payload describes one or more acoustic parameters of the receiving headset 100, 105, and the communication system modifies the audio content based on the acoustic parameters of the receiving headset 100, 105, as further described below in conjunction with FIG. 3. The modified audio content is transmitted to the receiving headset 100, 105 to be played for a receiving user.

Figure 2:
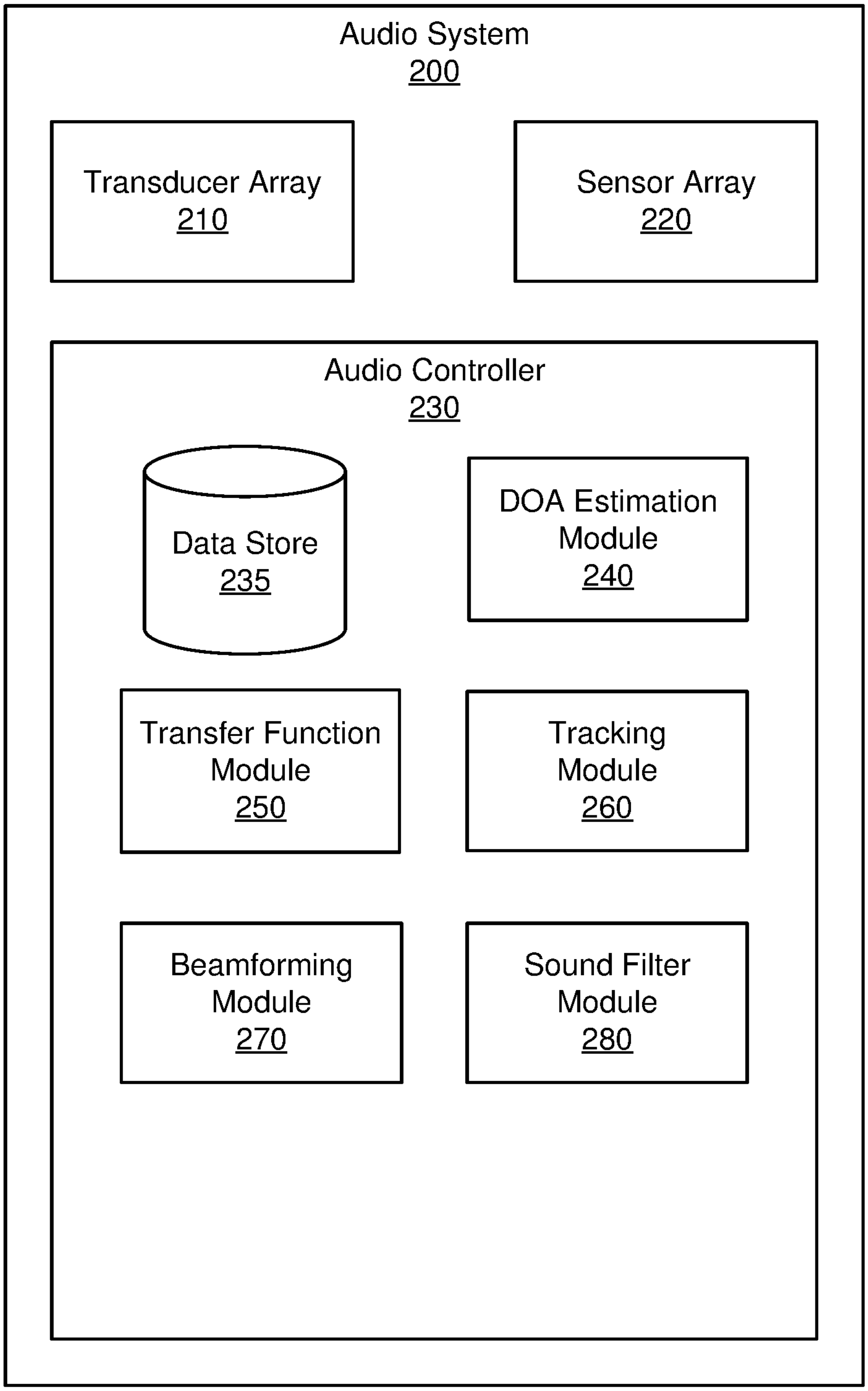
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 7).

The sound filter module 280 provides the sound filters to the transducer array 210. In some embodiments, the sound filters may cause positive or negative amplification of sounds as a function of frequency.

Figure 3:
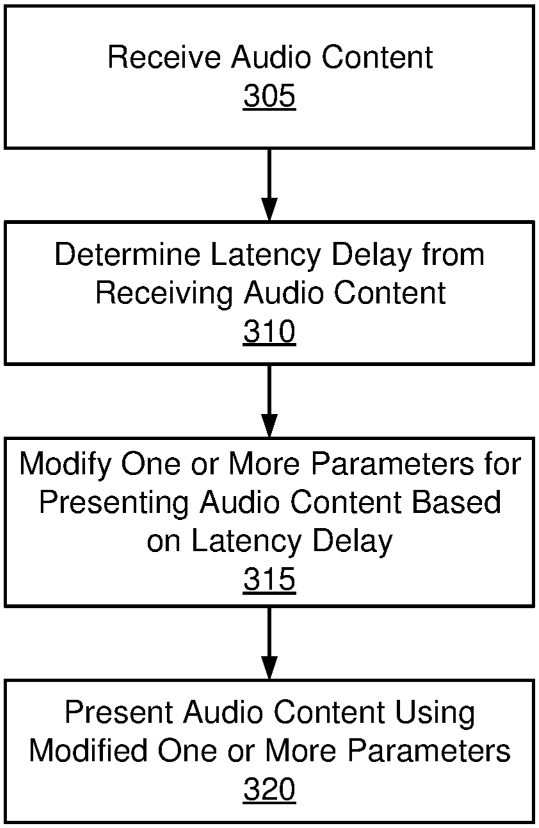
FIG. 3 is a flowchart of a method for modifying presentation of audio content in an artificial reality environment based on one or more latencies measured by a client device, in accordance with one or more embodiments.

FIG. 3 is a flowchart of a method for modifying presentation of audio content in an artificial reality environment based on one or more latencies measured by a client device. The process shown in FIG. 3 may be performed by components of an audio system 200, as further described above in conjunction with FIG. 2. Other entities may perform some or all of the steps in FIG. 3 in other embodiments. Embodiments may include different and/or additional steps, or perform the steps in different orders.

A client device receives 305 audio content for presentation to a user of the client device from a source. For example, the sending client device 300 is a headset 100, 105 as further described above in conjunction with FIGS. 1A and 1B. The audio content may be received 305 from an additional client device in some embodiments. In other embodiments, the audio content is received 305 from a server, such as a communication system, coupled to the client device via a network or another communication channel. The client device includes an audio system 200, such as further described above, configured to apply one or more transfer functions to the audio content. In various embodiments, application of the one or more transfer functions transforms the audio content captured based on acoustic properties of the local area including the client device (e.g., reverberation time, a reverberation level, a room impulse response) or a HRTF of the receiving user of the client device. In other embodiments, the transfer function function transforms the audio content based on acoustic properties for an artificial reality environment including an avatar of the user (e.g., reverberation time, a reverberation level, a room impulse response). This allows the audio content to appear to be placed within the local area of the user when played by the receiving client device. In some embodiments, the client device displays an artificial reality environment (or an augmented reality environment) to the user, and application of the one or more transfer functions spatialize the audio content to spear to originate from an audio source having a particular location relative to an avatar of the user in the virtual environment.

In various embodiments, application of the transfer function to the audio content delays presentation of the audio content by the client device for a delay interval based on one or more acoustic properties (e.g., room impulse response, a reverberation time, a reverberation level, etc.) of a local area including the client device or acoustic properties of a virtual environment including an avatar of the user. Additionally, the transfer function accounts for a distance between an avatar of a user of the client device in the artificial reality environment and a source of the audio content in the artificial reality environment.

Figure 4:
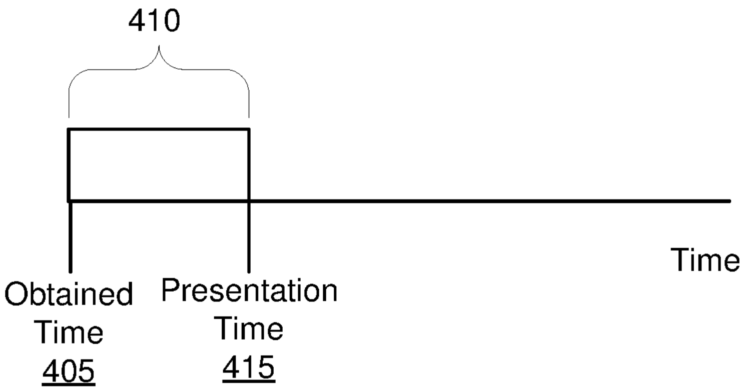
FIG. 4 is an example presentation of audio content by a client device, in accordance with an embodiment.

FIG. 4 shows an example presentation of audio content by a client device. In the example shown by FIG. 4, the client device obtains the audio content at obtained time 405. Application of one or more transfer functions by the client device introduces delay interval 410, which accounts for acoustic properties of the local area of the client device or for acoustic properties of the artificial reality environment including an avatar of the user and a location in the virtual environment of a source for the audio content. Thus, the client device presents the audio content to a user at presentation time 415, which occurs after the delay interval 410 from the obtained time 405 of the audio content.

Figure 5:
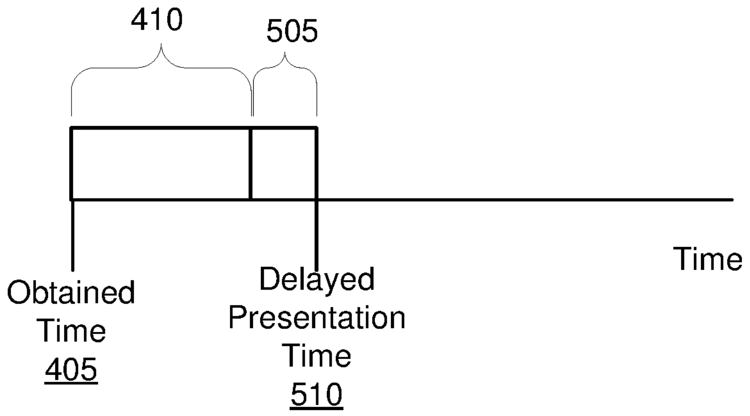
FIG. 5 is shows example presentation of audio content by a client device when one or more latencies are introduced from obtaining the audio content, in accordance with an embodiment.

Referring back to FIG. 3, one or more additional latencies are introduced from the client device receiving 305 the audio content. When the client device receives 305 the audio content from a server or from another client device, transmission of the audio content to the client device introduces latency from a communication channel between the client device and the server or other client device. Characteristics of a network through which the communication channel is established affect an amount of time for the client device to receive the audio content. Additionally, processing of the audio content for presentation to the user of the client device introduces additional latency. For example, decoding the audio content for presentation introduces additional latency, which may vary depending on a codec used to encode the audio content. As another example, a latency is introduced from retrieving the audio content from a storage device of the client device. In another example, a latency is introduced from the client device decoding the audio content for presentation. Hence, one or more latencies may be introduced from the client device retrieving and processing the audio data prior to presentation. These additional one or more latencies combine with the delay interval for the audio content FIG. 5 shows an example presentation of audio content by a client device when one or more latencies are introduced from obtaining the audio content. In the example of FIG. 5, the client device obtains the audio content at obtained time 415. As further described above in conjunction with FIGS. 3 and 4, application of one or more transfer functions to the audio content by the client device introduces delay interval 410. One or more latencies from the client device obtaining the audio content cause latency delay 505 shown in FIG. 5. For example, latency delay 505 includes delays from transmission of the audio content from another client device or a server through a network or through another communication channel, with the delay from transmission of the audio content affected by characteristics of the network or the communication channel. In another example, latency delay 505 accounts for amounts of time for the client device to process the audio content, such as an amount of time to decompress the audio content, which may be affected by a codec used by the client device to decompress the audio content. As shown in FIG. 5, the latency delay 505 combines with the delay interval 410 from application of the one or more transfer functions to the audio content to increase an overall amount of time from the client device obtaining the audio content to the client device presenting the audio content. In the example of FIG. 5, the latency delay 505 causes the client device to present the audio content at delayed presentation time 510, which is later than the presentation time 415 of FIG. 4 by the latency delay 505. This delay in presentation of the audio content may cause the audio content to lose synchronization with other content presented by the client device. For example, video content received in conjunction with the audio content is displayed at presentation time 415, shown in FIG. 4, while the audio content is presented at delayed presentation time 510, causing the audio content to be presented at a later time than a corresponding portion of the video content.

To compensate for additional delays from transmission and processing of the audio content, the audio system 200 of the client device determines a latency delay from the one or more additional latencies from receiving the audio content. For example, an application executing on the client device measures an amount of delay introduced by a communication channel between the client device and another client device or a server using any suitable method. In an example, the application measures a round trip time of a data packet from the client device to another client device or to a server to determine an amount of latency introduced by a communication channel between the client device and the other client device or the server. The application may periodically determine the amount of latency introduced by the communication channel and store information corelating different amounts of latency introduced by the communication channel and different times. Additionally, the audio system 200 determines an amount of latency from processing the audio content. For example, the audio system 200 determines an amount of time to decompress audio content based on characteristics of a codec used to decompress the audio content or based on amounts of time to decompress previously received audio content using the codec. Similarly, the audio system 200 determines amounts of time for one or more other types of processing of the audio content for application of the one or more transfer functions. For example, the audio system 200 determines amounts of time for one or more of: retrieving the audio content from a storage device of the client device, decoding the audio content for presentation, or any other tasks for retrieving and processing the audio data prior to presentation. The audio system 200 determines 310 the latency delay by combining the additional latencies. For example, the latency delay is a sum of the round trip time of the communication channel from which the audio content was received and an amount of time for the audio system 200 to decompress the audio data. However, the audio system 200 determines 310 the latency delay by combining any number of additional latencies determined by the audio system 200.

Figure 6:
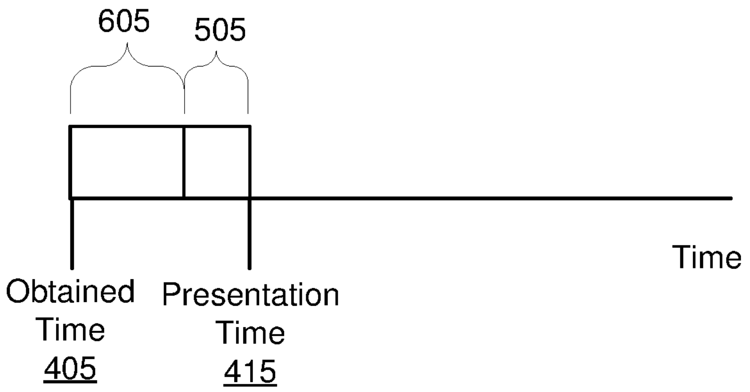
FIG. 6 is an example of an audio system of a client device reducing a delay interval introduced by a transfer function based on a latency delay determined by the audio system, in accordance with an embodiment.

Based on the latency delay, the audio system 200 modifies 315 one or more parameters for presenting the audio content to the user. In some embodiments, the audio system 200 modifies 315 a transfer function applied to the audio content by reducing a delay interval introduced to the audio content by the transfer function by an amount based on the latency delay. For example, the audio system 200 reduces the delay interval introduced to the audio content by the transfer function by the latency delay. FIG. 6 shows an example of an audio system 200 of a client device reducing a delay interval introduced by a transfer function based on a latency delay determined by the audio system 200. In the example of FIG. 6, the client device including the audio system 200 obtains the audio content at obtained time 415. As further described above in conjunction with FIGS. 3 and 4, application of one or more transfer functions to the audio content by the audio system 200 of the client device introduces delay interval 410. Additionally, as shown in FIG. 5, one or more latencies from the client device obtaining the audio content cause latency delay 505. In the example of FIG. 6, the audio system 200 reduces the delay interval 410 shown in FIG. 4 by an amount equal to the latency delay 505, resulting in modified delay interval 605, shown in FIG. 6. The modified delay interval 605 accounts for the latency delay 505 so the combination of latency delay 505 and the modified delay interval 605 results in the audio content being presented at presentation time 415, which corresponds to when the audio content would have been presented without the latency delay 505.

Referring back to FIG. 3, in some embodiments, the audio system 200 modifies 315 a distance between an avatar of the user of the client device and the source of the audio content in the artificial reality environment to compensate for the latency delay. For example, the audio system 200 increases a distance between an avatar of the user of the client device and the source of the audio content in the artificial reality environment to a distance corresponding to a propagation time of the audio content from the source to the avatar of the user in the artificial reality environment that equals or exceeds a combination of the latency delay and the delay interval. In some embodiments, the audio system increases a distance between the avatar of the user and the source of the audio content in an artificial reality environment by an amount based on the latency delay. For example, the distance between the avatar of the user and the source of the audio content in an artificial reality environment is increased by a product of a speed of sound (subject to a temperature and a pressure specified for the artificial reality environment) and the latency delay. Such repositioning of the source of the audio content in the artificial reality environment and the avatar of the user in the artificial reality environment allows the audio content to be presented to the user with effects from the latency delay mitigated.

The client device presents 320 the audio content to the user subject to the modified one or more parameters, which compensate for the latency delay determined by the audio system 200. Hence, modifying the one or more parameters allows the client device 320 to adjust presentation of the audio content to compensate for latencies introduced by receipt of the audio content and from processing the audio content, improving synchronization of the audio content with other content while providing spatial cues for the audio content through application of the one or more transfer functions.

While FIG. 3 describes an embodiment where a client device determines the latency delay and modifies one or more parameters for presenting the audio content, in other embodiments, a communication server determines the latency delay for a client device and modifies one or more parameters for presenting the audio content via the client device. In various embodiments, the communication system generates or obtains the audio content and transmits the audio content to one or more client devices for presentation to users. For example, the communication system determines an amount of latency introduced by a communication channel coupling the client device to the communication system. Based on the determined amount of latency, the communication system determines a distance between an avatar of a user of the client device in an artificial reality environment and a source of the audio content in the artificial reality environment, as further described above. The communication system transmits the audio content and the modified one or more parameters (e.g., the determined distance) to the client device for presentation by one or more speakers of the client device. In another example, the communication system transmits updated parameters for one or more transfer functions applied by the client device based on the latency delay, as further described above. In embodiments where the communication system modifies the one or more parameters, the communication system differently modifies parameters for different client devices based on latency delays determined for different client devices. For example, based on latency delays for different client devices, the communication system determines distances between avatars of users of different client devices and the audio source in the artificial reality environment (e.g., avatars of users of client devices with larger latency delays have longer distances to the audio source in the artificial reality environment, while avatars of users of client devices with smaller latency delays have shorter distances to the audio source in the artificial reality environment).

Figure 7:
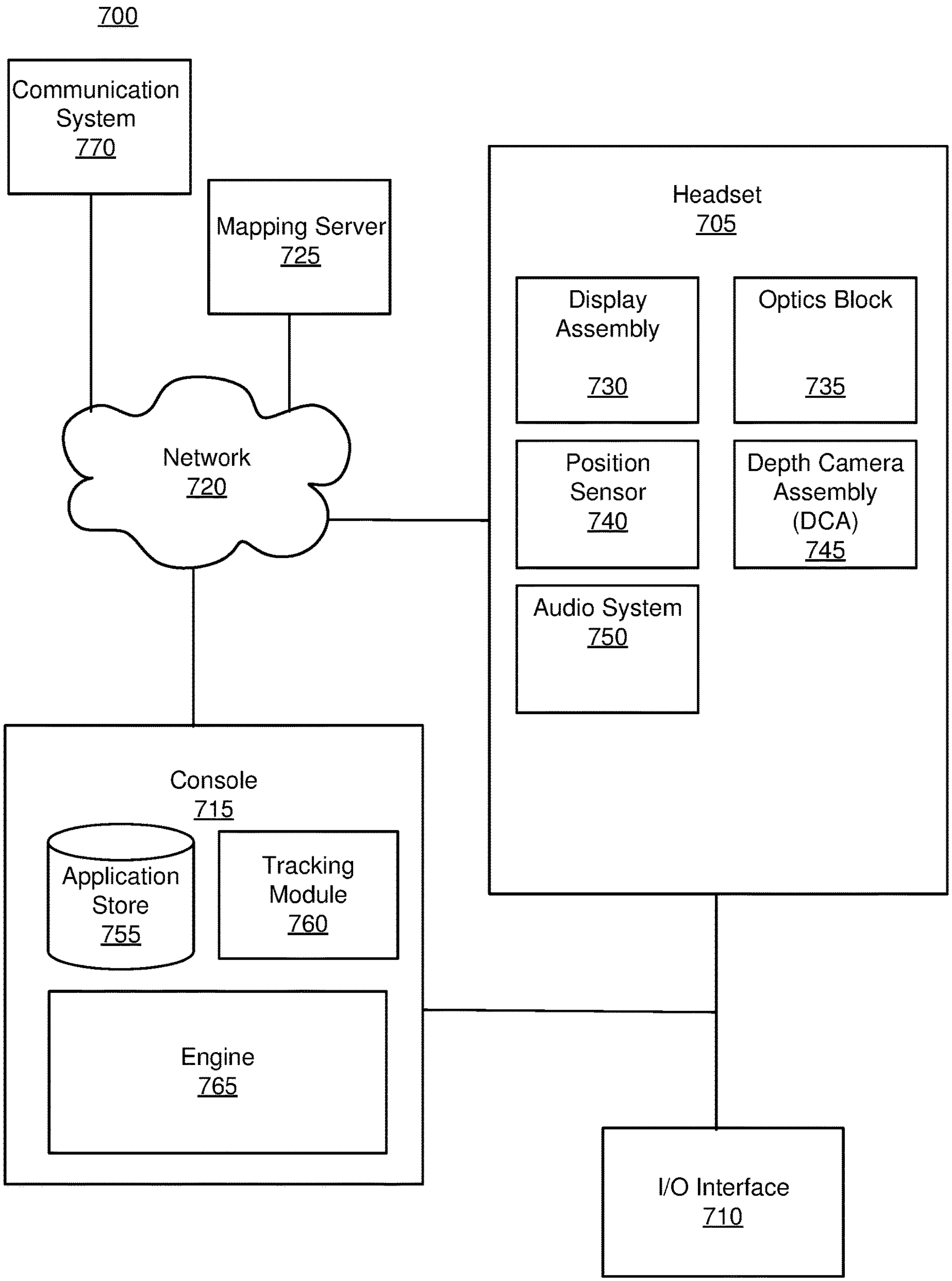
FIG. 7 is a system that includes a headset, in accordance with one or more embodiments.

FIG. 7 is a system 700 that includes a headset 705, in accordance with one or more embodiments. In some embodiments, the headset 705 may be the headset 100 of FIG. 1A or the headset 105 of FIG. 1B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 770, and the DCA 775. Some embodiments of headset 705 have different components than those described in conjunction with FIG. 7. Additionally, the functionality provided by various components described in conjunction with FIG. 7 may be differently distributed among the components of the headset 705 in other embodiments or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUs, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1A.

The audio system 750 provides audio content to a user of the headset 705. The audio system 750 is substantially the same as the audio system 200 describe above. The audio system 750 may comprise one or acoustic sensors, one or more transducers, and an audio controller. The audio system 750 may provide spatialized audio content to the user. In some embodiments, the audio system 750 may request acoustic parameters from the mapping server 725 over the network 720. The acoustic parameters describe one or more acoustic properties (e.g., room impulse response, a reverberation time, a reverberation level, etc.) of the local area. The audio system 750 may provide information describing at least a portion of the local area from e.g., the DCA 745 and/or location information for the headset 705 from the position sensor 740. The audio system 750 may generate one or more sound filters using one or more of the acoustic parameters received from the mapping server 725 and use the sound filters to provide audio content to the user.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 725 may include a database that stores a virtual model describing a plurality of spaces, wherein one location in the virtual model corresponds to a current configuration of a local area of the headset 705. The mapping server 725 receives, from the headset 705 via the network 720, information describing at least a portion of the local area and/or location information for the local area. The user may adjust privacy settings to allow or prevent the headset 705 from transmitting information to the mapping server 725. The mapping server 725 determines, based on the received information and/or location information, a location in the virtual model that is associated with the local area of the headset 705. The mapping server 725 determines (e.g., retrieves) one or more acoustic parameters associated with the local area, based in part on the determined location in the virtual model and any acoustic parameters associated with the determined location. The mapping server 725 may transmit the location of the local area and any values of acoustic parameters associated with the local area to the headset 705.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

In various embodiments, the system 700 includes a communication system 770 coupled to the headset 705 via the network 720. The communication system 770 obtains audio content and transmits the audio content to the headset 705 via the network 720. The audio content may be obtained from another headset 705, may be locally stored on the communication system 770, or retrieved from another source by the communication system 770. In various embodiments, the communication server 770 determines a latency delay for a client device and modifies one or more parameters for presenting the audio content via the client device, as further described above in conjunction with FIGS. 3-6. For example, the communication system 770 determines an amount of latency introduced by a communication channel coupling the headset 705 to the communication system 770. Based on the determined amount of latency, the communication system 770 determines a distance between an avatar of a user of the client device in an artificial reality environment and a source of the audio content in the artificial reality environment, as further described above in conjunction with FIG. 3. The communication system 770 transmits the audio content and the modified one or more parameters (e.g., the determined distance) to the headset 705 for presentation by one or more speakers of the headset 705. In another example, the communication system 770 transmits updated parameters for one or more transfer functions applied by the headset 705 based on the latency delay, as further described above in conjunction with FIG. 3.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

receiving, at a client device, audio content from a source;

determining, by the client device, a latency delay from one or more latencies introduced from receiving the audio content;

modifying, by the client device, one or more parameters for presenting the audio content to a user based on the latency delay, the one or more parameters including a delay interval introduced to the audio content by a transfer function applied to the audio content by an audio system of the client device, a distance between a location of the user and the source of the audio content in an artificial reality environment presented by the client device, or a combination thereof; and presenting the audio content to the user using the modified one or more parameters via one or more speakers of the client device.

2. The method of claim 1, wherein modifying, by the client device, the one or more parameters for presenting the audio content to the user based on the latency delay comprises:

reducing the delay interval introduced to the audio content by the transfer function applied to the audio content by the audio system of the client device based on the latency delay.

3. The method of claim 2, wherein reducing the delay interval introduced by the transfer function applied to the audio content by the audio system of the client device based on the latency delay comprises:

reducing the delay interval introduced to the audio content by the transfer function by the latency delay.

4. The method of claim 2, wherein the transfer function transforms the audio content based on acoustic properties of a local area including the client device.

5. The method of claim 1, wherein the transfer function transforms the audio content based on acoustic properties for the artificial reality environment including the location of the user.

6. The method of claim 1, wherein modifying, by the client device, the one or more parameters for presenting the audio content to the user based on the latency delay comprises:

modifying the distance between the location of the user of the client device and the source of the audio content in the artificial reality environment presented by the client device based on the latency delay.

7. The method of claim 6, wherein modifying the distance between the location of the user of the client device and the source of the audio content in the artificial reality environment presented by the client device based on the latency delay comprises:

increasing the distance between the location of the user of the client device and the source of the audio content in the artificial reality environment presented by the client device by an amount based on the latency delay.

8. The method of claim 7, wherein the amount comprises a product of the latency delay and a speed of sound.

9. The method of claim 1, wherein the latency delay includes a round trip time of a network over which the audio content was received.

10. The method of claim 1, wherein the latency delay includes an amount of time for the client device to decompress the audio content.

11. The method of claim 1, wherein the latency delay includes one or more of: an amount of time to retrieve the audio content from a storage device of the client device, an amount of time to decode the audio content for presentation, or any combination thereof.

12. The method of claim 1, wherein the client device comprises a headset including a display element configured to display video content to the user and the one or more speakers.

13. A method comprising:

obtaining audio content at a communication system;

determining, by the communication system, a latency delay for transmitting the audio content to a client device;

modifying, by the communication system, one or more parameters for presenting the audio content via the client device based on the latency delay, wherein the one or more parameters include a delay interval introduced to the audio content by a transfer function applied to the audio content by an audio system of the client device, a distance between a location of a user of the client device and a source of the audio content in an artificial reality environment presented by the client device, or a combination thereof; and transmitting the audio content to the client device for presentation by one or more speakers of the client device using the modified one or more parameters.

14. The method of claim 13, wherein modifying, by the communication system, the one or more parameters for presenting the audio content via the client device based on the latency delay comprises:

modifying the distance between the location of the user of the client device and the source of the audio content in the artificial reality environment presented by the client device based on the latency delay.

15. The method of claim 14, wherein modifying the distance between the location of the user of the client device and the source of the audio content in the artificial reality environment presented by the client device based on the latency delay comprises:

increasing the distance between the location of the user of the client device and the source of the audio content in the artificial reality environment presented by the client device by an amount based on the latency delay.

16. The method of claim 13, wherein the latency delay includes a round trip time of a network coupling the communication system to the client device.

17. A computer program product comprising a non-transitory computer readable storage medium having instructions encoded thereon that, when executed by a processor, cause the processor to:

receive at a client device, audio content from a source;

determine, by the client device, a latency delay from one or more latencies introduced from receiving the audio content;

modify, by the client device, one or more parameters for presenting the audio content to a user based on the latency delay, the one or more parameters including a delay interval introduced to the audio content by a transfer function applied to the audio content by an audio system of the client device, a distance between a location of the user and the source of the audio content in an artificial reality environment presented by the client device, or a combination thereof; and present the audio content to the user using the modified one or more parameters via one or more speakers of the client device.

18. The computer program product of claim 17, wherein modifying, by the client device, the one or more parameters for presenting the audio content to the user based on the latency delay comprises:

reducing the delay interval introduced to the audio content by the transfer function applied to the audio content by the audio system of the client device based on the latency delay.

19. The computer program product of claim 18, wherein reducing the delay interval introduced by the transfer function applied to the audio content by the audio system of the client device based on the latency delay comprises:

reducing the delay interval introduced to the audio content by the transfer function by the latency delay.

20. The computer program product of claim 17, wherein modifying, by the client device, the one or more parameters for presenting the audio content to the user based on the latency delay comprises:

modifying the distance between the location of the user of the client device and the source of the audio content in the artificial reality environment presented by the client device based on the latency delay.

21. The computer program product of claim 20, wherein modifying the distance between the location of the user of the client device and the source of the audio content in the artificial reality environment presented by the client device based on the latency delay comprises:

increasing the distance between the location of the user of the client device and the source of the audio content in the artificial reality environment presented by the client device by an amount based on the latency delay.

22. The computer program product of claim 17, wherein the latency delay includes a round trip time of a network over which the audio content was received.

23. The computer program product of claim 17, wherein the latency delay includes an amount of time for the client device to decompress the audio content.

24. The computer program product of claim 17, wherein the latency delay includes one or more of: an amount of time to retrieve the audio content from a storage device of the client device, an amount of time to decode the audio content for presentation, or any combination thereof.

25. The computer program product of claim 17, wherein the client device comprises a headset including a display element configured to display video content to the user and the one or more speakers.

* * * * *